Jan. 17, 1939. J. H. DAWSON 2,144,286
CURB PARKING SIGNAL
Filed July 11, 1934
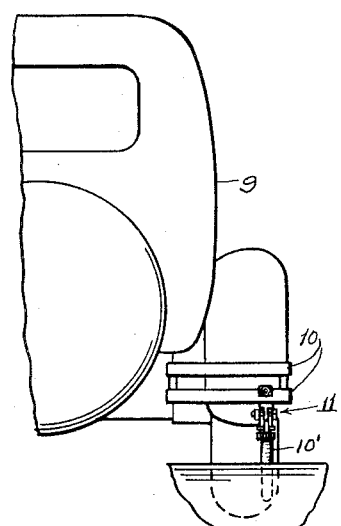
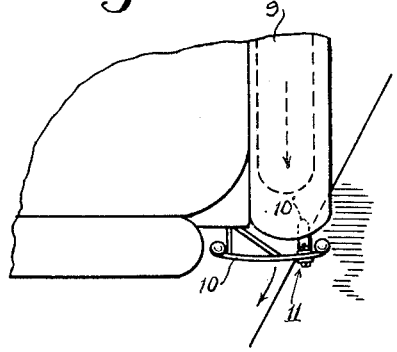
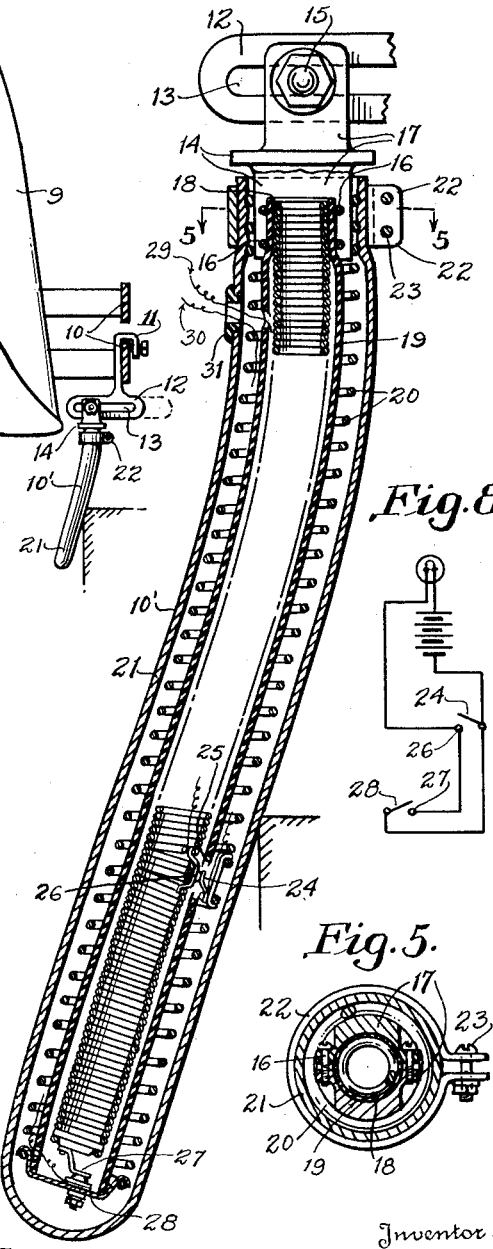
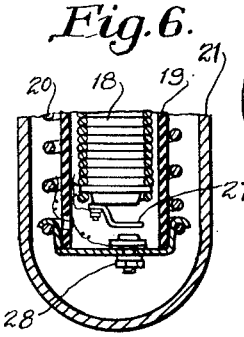
Inventor
JOHN H. DAWSON
By Mason Fenwick Lawrence
Attorneys Patented Jan. 17, 1939

2,144,286

UNITED STATES PATENT OFFICE 2,144,286

CURB PARKING SIGNAL

John H. Dawson, Rockville, Md., assignor to William J. Parkinson, Irondequoit, N. Y.

Application July 11, 1934, Serial No. 734,684

10 Claims. (Cl. 177—311)

This invention relates to a parking indicator; and more particularly, a signal device whereby the operator of the vehicle upon turning into a parking space will be informed at the proper time when to cut the wheels of the vehicle so that parking is facilitated.

At the present time, one of the most disagreeable and difficult tasks consists in parking a vehicle under crowded traffic conditions. Where parallel parking is in vogue and the space available is limited, it is usual for the operator to first go beyond the parking space and then back into the opening. Due to the fact that the curbing is out of vision, he must approximate when to cut his wheels to avoid contact with the curb and bring the vehicle parallel with it. Often, the operator waits too long before cutting the wheels and jams the car against the curb necessitating the forward movement of the vehicle and further manipulation, and often requiring a repetition of the entire parking procedure. Tires are often ruined and severly damaged by contact with the curb. In the case of diagonal parking where it is desired to back into the space, the tires are often brought into violent contact with the curb, jolting the occupants of the vehicle and damaging the tires. With my device, all of this can be avoided by the operator being informed at the proper time of the proximity of the curbing and when to cut the vehicle wheels.

One of the principal objects is to provide a device that will indicate to the operator when to cut the vehicle wheels to facilitate parking.

Another object is to indicate to the driver the proximity of the curb to prevent violent contact therewith.

Still another object is to save wear and tear on the vehicle occurring in connection with parking.

Other objects will be disclosed in the specification and claims forming a part of this application.

In the drawing:

Figure 1 is a fragmentary rear elevation showing the signal in relation to the curbing;

Figure 2 is a fragmentary top plan showing the vehicle about to be parked, the signal in contact with the curb, and the wheels in position to be cut to finish the parking operation;

Figure 3 is a fragmentary side elevation showing the supporting bracket partly in vertical section;

Figure 4 is a detailed vertical section of the signal;

Figure 5 is a cross section on line 5—5 of Figure 4;

Figure 6 is a fragmentary detailed section of the contact members in the signal;

Figure 7 is a vertical section of a modified form of the invention; and

Figure 8 is a wiring diagram of the preferred form.

Referring to the drawing, in which similar parts are designated by like numerals:

Numeral 9 designates a motor vehicle having a rear bumper 10 secured in the usual manner; a flexible circuit closer 10' secured thereto by way of an adjustable clamp 11, with a bracket 12 having an elongated slot 13 formed in the bottom portion thereof.

A split thimble fitting 14 is slidably mounted in slot 13 and may be fixed in position by tightening a bolt and nut 15. The fitting 14 comprises two halves 17 with tightening screws 16. A finely wound spring 18 is inserted within the two halves 17 of the fitting 14 and secured in place. A flexible insulating liner 19 is placed around the spring 18, and a second spring 20 of coarser winding and slightly longer in length than the spring 18, is placed on the outside of the fitting 14 with a closed end casing of insulating flexible material 21 surrounding the spring 20. A split ring 22 with tightening screws 23 holds the casing and coarse spring 20 in position. Attached to the spring 20 and spaced from the bottom is an insulated contact member 24, said contact member being made of curved spring steel. An opening 25 is formed through the insulating liner 19 so that the contact member 24 can engage a second contact member 26, upon the spring 18 being elongated through flexing of the flexible circuit closer 10'. At the bottom of the spring 19 is secured another contact member 27 adapted to engage a contact member 28 carried by the coarse spring 20. The contact members 24 and 26 are wired in multiple or parallel with the contact members 27 and 28, as shown in Fig. 8, and the wires 29 and 30 extend through an opening 31 in the side of the casing 21 to a light, or other signal, not shown, affixed to the instrument board of the vehicle.

As used, the device will normally be out of contact, but upon the operator attempting to park the vehicle, and backing into the parking space, the flexible circuit closer 10' will come into contact with the curb; and, due to the difference in the winding of the two springs, will cause the inner spring 18 to elongate to a greater extent than the outer spring 20 upon being moved out of vertical position, so that the contacts 24 and 26 will be brought into engagement, lighting the light on the instrument board, and thus indicating to the operator that it is the proper time to cut the wheels to complete the parking operation. If the elongation of the inner spring continues, the contacts 27 and 28 will be closed, thus doubly insuring the operation of the signal, or the operation of a second light.

The flexible circuit closer is spaced a sufficient distance behind one of the rear wheels so that if the operator cuts the wheels at the time that the signal operates, the vehicle can be parked without additional maneuvering. As shown in Figure 4 the flexible circuit closer is flexed so that the contacts are in closed position. As shown in Figure 6 the bottom contact is in open position.

A modified form of the invention is shown in Figure 7 wherein the contacts 27 and 28 are normally in closed position, and upon the flexing of the casing, the circuit will be broken. Under this construction, it will be necessary for the operator to operate a switch on the instrument board, lighting a light, before the parking operation commences. Upon the flexible tubing contacting the curbing, the circuit will be broken and the light will go out, thus indicating to the operator the proper time to cut the wheels.

I desire it understood that I do not limit myself to the particular arrangement of contacts disclosed, as I realize that this may be varied and still come within the scope of my invention. It is perfectly feasible, instead of having a flexible circuit closer or breaker, to have projecting contacts which, upon contact with the curb, will either make or break the circuit, indicating a signal to the driver so that the parking operation may be completed.

Modifications and changes will readily suggest themselves but I do not wish to be limited in the scope of my invention, except as set forth in the claims appended hereto.

What I claim is:

1. A parking indicating device comprising in combination with a vehicle, a signal operating means positioned at one end of said vehicle, spaced from the outer periphery of one of the wheels and positioned in fore and aft alinement with the wheel on that side of the wheel which is remote from the transverse center line of the vehicle and positioned relatively close to the road surface so that it may contact with and be operated by an obstruction of normal curb height in the path of said wheel, and means operable by said signal operating means for indicating contact with said obstruction.

2. A parking indicating device comprising in combination with a vehicle, a flexible signal operating means positioned at one end of said vehicle spaced from the outer periphery of one of the wheels, and positioned in fore and aft alinement with the wheel on that side of the wheel which is remote from the transverse center line of the vehicle, and extending relatively close to the road surface so it may contact with and be flexed by striking an obstruction of normal curb height in the path of said wheel, and means operated by the flexing of said signal operating means for indicating contact with such obstruction.

3. A parking indicating device comprising a flexible signal operating means secured to a bumper, and consisting of two flexible members spaced apart, insulating material between said members, contacts on said members, an opening in said insulating material opposite the contacts, a flexible covering over said flexible members, the flexing of the two flexible members being effective to bring the two contacts into and out of engagement, and means operable by the engagement of said contact members for indicating contact with an obstruction.

4. A parking indicating device comprising a signal operating means to be secured to a part of a motor vehicle, said operating means comprising a closely wound spring within a less closely wound spring, contact members on said springs, the contact member on the inner spring being above the one on the outer spring, the flexing of the two springs being effective to elongate the inner spring and bring the contacts on the two springs into and out of engagement with each other, and means operable by the engagement of said contact members for indicating contact with an obstruction.

5. A parking indicating device comprising a signal operating means to be secured to a part of a motor vehicle, said operating means comprising a closely wound spring within a less closely wound spring, contact members on said springs, each spring having a plurality of contact members, the contact members on the outer spring being disposed below substantially oppositely disposed contact members on the inner spring, the flexing of the two springs being effective to elongate the inner spring and bring its contacts into successive engagement with the respective contacts on the outer spring as the inner spring continues to be elongated, and means operable by the engagement of said contact members for indicating contact with an obstruction.

6. A parking indicating device comprising a signal operating means to be secured to a part of a motor vehicle, said operating means comprising a closely wound spring within a less closely wound spring, contact members on said springs, the contact member on the inner spring being above the one on the outer spring, the flexing of the two springs being effective to elongate the inner spring and bring its contact into engagement with the contact on the outer spring, flexible insulating material between the two springs, said insulating material having an opening through which said contact members may cooperate with each other, a flexible housing encasing the outer spring, and means operable by the engagement of said contact members to indicate a contact with an obstruction.

7. A curb signal for a vehicle having wheels for rolling upon a road surface, comprising feeler means mounted on said vehicle and having a portion in direct alinement with one of the vehicle wheels in a direction longitudinally of the vehicle and spaced a substantial distance in said direction from said one of the wheels on that side thereof which is remote from the transverse center line of the vehicle and at an elevation in close proximity to said road surface so as to come into contact with a curb in the path of travel of said portion of said feeler means, and signal means operated by contact of said portion of said feeler means with a curb for notifying the driver of the vehicle of such contact.

8. A curb signal for a vehicle having wheels for rolling upon a road surface, comprising bracket means mounted on said vehicle, said bracket means including a portion extending through a substantial length in an approximately horizontal direction, feeler means mounted on said bracket means for adjustment to different positions throughout a substantial distance along said horizontally extending portion of said bracket means, said feeler means having a portion in close proximity to said road surface to contact with a curb, and means operated by contact of said portion of said feeler means with a curb for indicating to the driver of the vehicle the fact of such contact.

9. A curb signal for a vehicle having wheels for rolling upon a road surface, comprising two readily flexible tubular members arranged one inside the other, both of said members being mounted on said vehicle at a point materially above said road surface and extending therefrom in a generally downward direction into proximity to said road surface near one of the vehicle wheels in a position outside the area defined by lines drawn from said one of the vehicle wheels to the other wheels and placed so as to come into contact with and be flexed by a curb when the vehicle approaches said curb before said one of the wheels reaches the curb, and electric circuit means operated by the flexing of said two tubular members for indicating to the driver of the vehicle the fact of such contact.

10. The combination with a motor vehicle having a rear bumper behind a rear wheel of the vehicle, said bumper extending a substantial distance in a direction across the vehicle, of a bracket adjustably mounted on said bumper and movable to different positions along said bumper, said bracket having a portion extending a substantial distance in a fore and aft direction with respect to said vehicle, a feeler adjustably mounted on said fore and aft extending portion of said bracket so that it may be moved to different positions therealong, said feeler depending from said bracket into close proximity to the road surface so that it will engage a curbstone upon backing the vehicle toward such curbstone, and means for indicating such engagement to the driver.

JOHN H. DAWSON.